United States Patent
Brainerd

[15] 3,668,627
[45] June 6, 1972

[54] AIR CUSHION ACTUATION AND MONITORING CIRCUIT

[72] Inventor: Wendell C. Brainerd, Milwaukee, Wis.
[73] Assignee: General Motors Corporation, Detroit, Mich.
[22] Filed: Sept. 21, 1970
[21] Appl. No.: 73,687

[52] U.S. Cl. .............................340/52 H, 180/103, 340/248
[51] Int. Cl. .........................................B60g 1/00, B60r 21/08
[58] Field of Search .............340/52 H, 253 A, 253 R, 248 A, 340/248 N; 180/103, 82; 307/10 R, 130, 125, 121; 280/150 SB

[56] References Cited

UNITED STATES PATENTS

| | | | |
|---|---|---|---|
| 3,271,753 | 9/1966 | Luce | 340/248 A |
| 3,549,169 | 10/1968 | Oldberg et al. | 180/103 |
| 3,552,768 | 1/1971 | Kaiser | 180/103 |
| 3,556,556 | 1/1971 | Goetz | 180/103 |

*Primary Examiner*—John W. Caldwell
*Assistant Examiner*—Glen R. Swann, III
*Attorney*—Eugene W. Christen, Creighton R. Meland and Albert F. Duke

[57] ABSTRACT

A control circuit for actuating an inflatable air cushion in a motor vehicle includes a series network comprising an electrically operated actuator connected between first and second normally open acceleration responsive switches. The series network is connected across the vehicle battery as well as a storage capacitor to provide redundant sources for operating the actuator upon simultaneous closure of the switches in response to acceleration or deceleration of the vehicle in excess of a predetermined magnitude and duration. A diode is connected between the first switch and the actuator and a resistor is connected across the first switch and the diode to thereby establish a normally relatively high potential at a junction between the actuator and the second switch and to reverse bias the diode and establish a relatively low potential at a junction between the diode and the first switch. Logic circuitry is provided for monitoring the voltage at the two junctions and for energizing indicator means and recording means in the event of a malfunction in the control circuit resulting in the voltages at the two junctions assuming substantially the same value.

5 Claims, 1 Drawing Figure

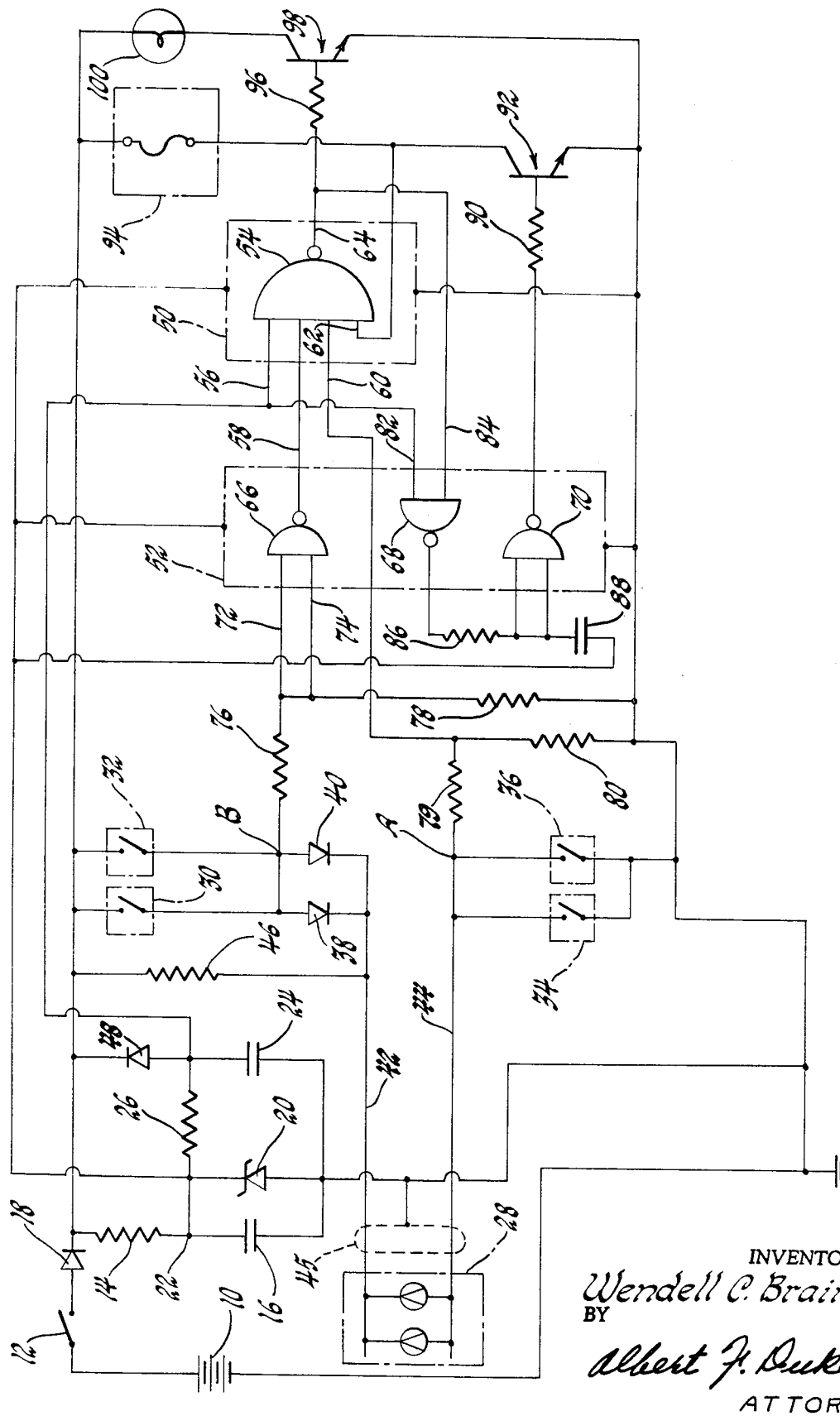
INVENTOR.
Wendell C. Brainerd
BY
Albert F. Duke
ATTORNEY

AIR CUSHION ACTUATION AND MONITORING CIRCUIT

This invention relates to control circuits for actuating a safety device located in a passenger conveyance for the purpose of protecting the passenger from injury in the event of a collision and more particularly to circuit means for continuously monitoring the control circuit to indicate a malfunction in the circuit which might prevent its proper operation.

It is an object of the present invention to provide a simplified but highly reliable and inexpensive control and malfunction detection circuit for an electrically actuated vehicle safety device.

CROSS-REFERENCE TO RELATED APPLICATIONS

In U.S. Pat. application Ser. No. 62,381, entitled "Air Cushion Actuation and Monitoring Circuit" by Arden G. Gillund and assigned to the assignee of the present invention, there is disclosed a circuit similar to that of the present invention.

BRIEF SUMMARY OF THE INVENTION

While the circuit of the aforementioned patent application is quite adequate for the purpose intended, the present invention represents an improvement from the standpoint of reduction of parts with consequent lower costs. In addition, whereas the circuit of the aforementioned patent application relied on a storage capacitor as the sole source of firing the actuator the present invention permits firing of the actuator from either the vehicle battery or a storage capacitor thereby providing a redundant source of firing potential.

BRIEF DESCRIPTION OF THE DRAWING

A more complete understanding of the present invention may be had from the following detailed description which should be read in conjunction with the single drawing showing a preferred embodiment of the invention.

DETAILED DESCRIPTION

Referring to the drawing a source of electrical power such as the vehicle battery 10 is shown to have a positive terminal connected with a manually operated on/off switch such as the vehicle ignition switch 12 and a negative terminal connected to a reference potential such as ground. A filter network comprising a resistor 14 and a capacitor 16 is connected across the battery 10 through a diode 18. A zener diode 20 establishes a reference potential at a junction 22 from which a storage capacitor 24 is charged through a charging resistor 26. Actuator means such as redundant parallel connected squibs 28 are connected across the battery 10 through parallel connected condition responsive switches 30, 32 and 34, 36. Connected between each of the switches 30, 32 and the squibs 28 are forwardly poled redundant parallel connected diodes 38 and 40. The conductors 42 and 44 are shielded as indicated at 45 from radio frequency interference to prevent inadvertent firing of the squibs 28. A resistor 46 is connected across the switches 30, 32 and diodes 38, 40 to reverse bias the diodes 38, 40 to normally establish a relatively high voltage of substantially battery potential at a junction A between the squibs 28 and the switches 34, 36 and to establish a relatively low voltage of substantially ground potential at a junction B between the switches 30, 32 and the diodes 38, 40.

The switches 30 and 34 are normally open acceleration responsive switches which close when the vehicle is subject to acceleration or deceleration in excess of a predetermined magnitude and time duration such as would occur during a collision. A suitable acceleration sensor is described in copending application Ser. No. 35,674 filed May 8, 1970 entitled SENSOR by Arden G. Gillund and assigned to the assignee of the present invention. Switches 32 and 36 respond to roll over of the vehicle and may be any suitable attitude responsive switch which closes when the vehicle is inclined from the horizontal by a predetermined amount. Upon closure of either of the switches 30, 34 or 32, 36 the squibs 28 are connected directly across the battery 10 through the diode 18 which causes the squibs to be fired to actuate apparatus for inflating an air cushion. Further details regarding a suitable apparatus for inflating an air cushion in response to firing of the squibs 28 may be found in copending patent application A-14,426 Ser. No. 36,080 filed May 11, 1970 entitled "Occupant Restraint", assigned to the assignee of the present invention. The capacitor 24 also provides a source of firing potential for the squibs 28 through a diode 48 in the event the battery becomes disconnected or shorted to ground during the collision or otherwise fails to provide the necessary firing potential. In such event the diode 18 insures that the capacitor 24 will not discharge through the battery.

Malfunctions in the control circuit such as abnormal closure of the switches 30, 32 or 34, 36 open or shorted squib cables 42, 44 or short circuit of the capacitor 24 is detected by monitoring the voltage at the junctions A and B. The malfunction detection circuitry for monitoring the voltage at the junctions A and B comprises logic elements 50 and 52 connected across the zener diode 20. The logic element 50 may be RCA part CD4011D comprising a NAND gate 54 having inputs 56, 58, 60 and 62 and an output 64. The logic element 52 may be RCA part CD4012D and comprises three NAND gates 66, 68 and 70. The NAND gate 66 is connected as an inverter and has inputs 72 and 74 connected to the junction B through a buffer resistor 76 and through a pull down resistor 78 to ground to insure that the inputs to the NAND gate 66 are a logic "zero" in the absence of a logic "one" at the junction B. The output of the NAND gate 66 is connected to the input 58 of the NAND gate 54. The input 60 of the NAND gate 54 is connected to the junction A through a buffer resistor 79 and to ground through a pull down resistor 80 which insures that a logic "zero" appears at the input 60 in the absence of a logic "one" input at the junction A. The NAND gate 68 has inputs 82 and 84. The input 82 of NAND gate 68 as well as the input 56 of NAND gate 54 are connected to the storage capacitor 24. The input 84 of NAND gate 68 is connected to the output of NAND gate 54. The output of NAND gate 68 is connected through a resistor 86 and capacitor 88 to the zener diode 20. The NAND gate 70 is connected as an inverter having both inputs connected to the junction between the resistor 86 and the capacitor 88. The output of the NAND gate 70 is connected through a resistor 90 to the base of a transistor 92 having its emitter grounded and its collector connected through a recorder 94 to the battery 10. The recorder 94 may be any type providing a permanent record and is schematically illustrated as a fuse. The collector of transistor 92 is also connected to the input 62 of NAND gate 54. The output 64 of NAND gate 54 is connected through a resistor 96 to the base of a transistor 98 having its emitter grounded and its collector connected to the battery 10 through an indicator lamp 100.

OPERATION

The operation of the circuit will now be described. Upon closure of the ignition switch 12 the capacitor 24 begins to charge through the diode 18, resistor 14 and resistor 26. Assuming the switches 30, 32, 34 and 36 are open the squibs 28 and switches 34, 36 are biased at substantially battery potential through the resistor 46 establishing a logic "one" at junction A. The diodes 38 and 40 are reversed biased thereby maintaining a logic "zero" at the junction B. The logic "one" at junction A is applied to the input 60 of NAND gate 54 while the logic "zero" at junction B is inverted by the NAND gate 66 to provide a logic "one" at the input 58. Initially the input 56 of NAND gate 54 and the input 82 of NAND gate 68 are a logic "zero" due to the discharged state of the capacitor 24. This produces a logic "one" at the output 64 of NAND gate 54 rendering the transistor 98 conductive and energizing the lamp 100. The logic "zero" at input 82 of NAND gate 68 produces a logic "one" at the output of NAND gate 68 which is inverted by the NAND gate 70 to maintain the transistor 92 in a non-conductive state. When the capacitor 24 charges above the threshold levels of the NAND gate 54 the output 64 switches to a logic "zero" rendering the transistor 98 non-conductive and deenergizing the lamp 100. The logic "zero" output from NAND gate 54 maintains the output of the NAND gate 68 at a logic "one".

In the event of malfunction or failure or either of the switches 30, 32 resulting in their closure under conditions other than those for which they were designed, the voltage to the junction B will rise to substantially potential of battery 10 which would be inverted by the NAND gate 66 to provide a logic "zero" to the input of NAND gate 54. In the event of a malfunction of either of the switches 34 or 36, or an open circuit in squibs 28 or the squib cables 42 or 44, or if the squib cables 42 or 44 short to the shield 45 the voltage at the junction A drops to substantially ground potential which applies a logic "zero" to the input 60 of NAND gate 54. Thus, under any of the aforementioned malfunctions at least one logic "zero" is applied to the NAND gate 54 resulting in a logic "one" at the output 64 of the NAND gate 54 which renders the transistor 98 conductive and energizes the lamp 100. The logic "one" at the input 84 of NAND gate 68 along with the logic "one" at the input 82 from the charged capacitor 24 produces a logic "zero" at the output of NAND gate 68 which permits the capacitor 88 to charge through the resistor 86. Depending on the threshold level of the NAND gate 70 a point is reached during charging of capacitor 88 which applies a logic "zero" at the input of NAND gate 70 which is inverted applying a logic "one" to the base of transistor 92 energizing the recorder 94 and substantially grounding the input 62 of NAND gate 54. The resulting logic "zero" to the input 62 of NAND gate 54 latches the NAND gate 54 providing a continuous logic "one" at the output 64. Thus the lamp 100 is continuously energized whenever the recorder 94 is energized. The time constant of the RC network comprising resistor 86 and capacitor 88 is adjusted to provide a time delay sufficient to prevent nuisance failures due to electrical noise or transients from rendering the transistors 92 conductive and thus preventing inadvertant energization of the recorder 94. Upon opening of the ignition switch the capacitor 24 discharges through the diode 48, the resistor 46, the squibs 28, and the resistors 79 and 80. The impedance in the discharge path is sufficiently large to limit the current through the squibs 28 to a value insufficient to fire the squibs 28.

Having thus described my invention what I claim is:

1. In a passenger conveyance provided with a safety device actuable by electrically operated actuator means, a control circuit for operating said actuator means comprising a first normally open condition responsive switch means, means connecting one side of said first switch means to a source of direct current, a diode having an anode connected to the other side of said first switch means and a cathode connected to one side of said actuator means, a second normally open condition responsive switch means connecting the other side of said actuator means to a reference potential, resistor means connected across said first switch means and said diode to normally reverse bias said diode and establish a relatively high potential at a first junction between said actuator means and said second switch means and a relatively low potential at a second junction between said first switch means and said diode, indicator means, control switch means responsive to the voltage at said first and second junctions for energizing said indicator means whenever the voltage at said first and second junctions are substantially the same to thereby indicate a malfunction of either of said first or second switch means.

2. The invention defined in claim 1 further comprising a storage capacitor, resistor means connecting said capacitor to said source, a diode connected in parallel with said resistor means for discharging said capacitor through said actuator means in response to loss of said source and simultaneous closure of said first and second switch means.

3. The invention defined in claim 2 wherein said control switch means comprises inverter means for inverting the voltage at one of said junctions, AND function performing logic gate means responsive to the voltages at said capacitor, at the other of said junctions and at the output of said inverter means, and a transistor having emitter and collector electrodes connected in series with said indicator means and a base electrode connected to the output of said logic gate means.

4. The invention defined in claim 3 further comprising recorder means, time delay means for energizing said recorder means a predetermined interval of time after energization of said indicator means and latch means for insuring continuous energization of said indicator means upon energization of said recorder means.

5. In a passenger conveyance provided with a safety device actuable by electrically operated actuator means, and including a control circuit for operating said actuator means comprising first and second normally open condition responsive switch means connected to opposite sides of said actuator means and across a source of direct current, malfunction detection circuitry comprising a diode connected between said first switch means and said actuator means and poled to permit current flow from said first switch means to said actuator means, a resistor connected across said first switch means and said diode to normally reverse bias said diode and establish a relatively high potential at a first junction between said actuator means and said second switch means and a relatively low potential at a second junction between said first switch means and said diode, indicator means, control switch means responsive to the voltage at said first and second junctions for energizing said indicator means whenever the voltage at said first and second junctions are substantially the same to thereby indicate a malfunction of either of said first or second switch means.

* * * * *